United States Patent
Chen et al.

(10) Patent No.: US 7,901,780 B2
(45) Date of Patent: Mar. 8, 2011

(54) POLYMER INTERLAYERS COMPRISING BLENDS OF PLASTICIZED POLY(VINYL BUTYRAL) AND POLY(CYCLOHEXANEDIMETHYLENE TEREPHTHALATE-CO-ETHYLENE TEREPHTHALATE) COPOLYESTER

(75) Inventors: Wenjie Chen, Amherst, MA (US); Aristotelis Karagiannis, Amherst, MA (US); Witold Szydlowski, Wilbraham, MA (US); John Joseph D'Errico, Glastonbury, CT (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 12/146,410

(22) Filed: Jun. 25, 2008

(65) Prior Publication Data

US 2009/0324969 A1 Dec. 31, 2009

(51) Int. Cl.
*B32B 17/10* (2006.01)
*B32B 27/08* (2006.01)
*B32B 27/30* (2006.01)
*B32B 27/36* (2006.01)
*B32B 37/16* (2006.01)

(52) U.S. Cl. ......... 428/430; 428/426; 428/441; 428/480; 428/483; 428/515; 428/516; 428/520; 428/522; 428/523; 428/423.1; 428/423.7; 428/424.4; 525/165; 525/173; 525/174; 525/176; 156/297; 156/299; 264/176.1

(58) Field of Classification Search .......... None
See application file for complete search history.

(56) References Cited

U.S. PATENT DOCUMENTS

| | | | |
|---|---|---|---|
| 4,243,719 A * | 1/1981 | Holmes | 340/550 |
| 4,310,584 A | 1/1982 | Cooper | |
| 4,373,002 A | 2/1983 | Petersen-Hoj | |
| 4,452,840 A | 6/1984 | Sato | |
| 4,465,736 A | 8/1984 | Nishihara | |
| 4,536,538 A | 8/1985 | Liu | |
| 4,559,388 A | 12/1985 | Liu | |
| 4,634,737 A | 1/1987 | Liu | |
| 4,671,913 A | 6/1987 | Gen | |
| 4,911,984 A | 3/1990 | Parker | |
| 4,973,511 A | 11/1990 | Farmer | |
| 5,091,258 A | 2/1992 | Moran | |
| 5,324,467 A | 6/1994 | Anderson | |
| 5,380,597 A * | 1/1995 | Klang et al. | 428/441 |
| 5,427,842 A | 6/1995 | Bland | |
| 5,455,103 A | 10/1995 | Hoagland | |
| 5,824,394 A | 10/1998 | Kinoshita | |
| 6,093,471 A | 7/2000 | Hopfe | |
| 6,336,988 B1 | 1/2002 | Enlow | |
| 6,451,414 B1 | 9/2002 | Wheatley | |
| 6,475,505 B1 * | 11/2002 | Stadler | 424/411 |
| 6,559,212 B1 * | 5/2003 | D'Errico et al. | 524/317 |
| 6,582,783 B2 | 6/2003 | Hiraishi | |
| 6,596,843 B2 | 7/2003 | Brunelle | |

(Continued)

FOREIGN PATENT DOCUMENTS

EP 91870026.1 8/1991

(Continued)

*Primary Examiner* — Vivian Chen
(74) *Attorney, Agent, or Firm* — Lewis, Rice & Fingersh, L.C.

(57) ABSTRACT

It has now been discovered, according to the present invention, that interlayers comprising a blend of plasticized poly(vinyl butyral) and poly(cyclohexanedimethylene terephthalate-co-ethylene terephthalate) copolyester can be used to form interlayers having a pearly white appearance. Such interlayers are useful in applications in which a colored multiple layer glass interlayer is desirable.

15 Claims, 2 Drawing Sheets

U.S. PATENT DOCUMENTS

| | | |
|---|---|---|
| 6,610,409 B2 | 8/2003 | Pickett |
| 6,664,366 B2 | 12/2003 | Silva |
| 6,667,095 B2 | 12/2003 | Wheatley |
| 6,689,474 B2 | 2/2004 | Pickett |
| 6,737,154 B2 | 5/2004 | Jonza |
| 6,773,804 B2 | 8/2004 | Enlow |
| 6,783,349 B2 | 8/2004 | Neavin |
| 6,788,463 B2 | 9/2004 | Merill |
| 6,797,396 B1 | 9/2004 | Liu |
| 6,803,110 B2 | 10/2004 | Drees |
| 6,808,658 B2 | 10/2004 | Stover |
| 6,827,886 B2 | 12/2004 | Neavin |
| 6,830,713 B2 | 12/2004 | Hebrink |
| 6,844,047 B2 | 1/2005 | Kaminsky |
| 6,927,900 B2 | 8/2005 | Liu |
| 7,041,307 B2 * | 5/2006 | Stadler .................. 424/409 |
| 7,081,300 B2 | 7/2006 | Laurence |
| 7,087,682 B2 | 8/2006 | Tadros |
| 7,135,524 B2 * | 11/2006 | Breitscheidel et al. ......... 525/58 |
| 7,214,414 B2 | 5/2007 | Khemani |
| 7,236,296 B2 | 6/2007 | Liu |
| 7,399,525 B2 | 7/2008 | Karagiannis |
| 7,510,768 B2 * | 3/2009 | Crawford et al. ............ 428/412 |
| 7,642,307 B2 * | 1/2010 | Wong et al. .................... 524/297 |
| 2001/0046086 A1 | 11/2001 | Wheatley |
| 2003/0012904 A1 | 1/2003 | Hutchinson |
| 2003/0144469 A1 | 7/2003 | Kauffman |
| 2004/0004778 A1 | 1/2004 | Liu |
| 2004/0127614 A1 * | 7/2004 | Jiang et al. .................... 524/270 |
| 2004/0135742 A1 | 7/2004 | Weber |
| 2004/0247879 A1 | 12/2004 | Osada |
| 2005/0019530 A1 | 1/2005 | Merrill |
| 2005/0192398 A1 * | 9/2005 | Wong et al. .................... 524/557 |
| 2005/0207002 A1 | 9/2005 | Liu |
| 2006/0093830 A1 | 5/2006 | Karagiannis |
| 2007/0009714 A1 | 1/2007 | Lee |
| 2008/0047655 A1 | 2/2008 | Karagiannis |
| 2008/0050579 A1 | 2/2008 | Kirkman |
| 2008/0096143 A1 | 4/2008 | Quintens |
| 2008/0160321 A1 | 7/2008 | Padiyath |

FOREIGN PATENT DOCUMENTS

| | | |
|---|---|---|
| EP | 0 461 751 | * 12/1991 |
| EP | 0 918 064 A2 | 5/1999 |
| WO | WO 97/22474 | 6/1997 |
| WO | WO 2007/143746 | * 12/2007 |

* cited by examiner

POLYMER INTERLAYERS COMPRISING BLENDS OF PLASTICIZED POLY(VINYL BUTYRAL) AND POLY(CYCLOHEXANEDIMETHYLENE TEREPHTHALATE-CO-ETHYLENE TEREPHTHALATE) COPOLYESTER

FIELD OF THE INVENTION

The present invention is in the field of polymer interlayers used in multiple layer glass panels having one or more glass layers, and specifically the present invention is in the field of polymer interlayers comprising a polymer sheet comprising a blend of poly(vinyl butyral) and poly(cyclohexanedimethylene terephthalate-co-ethylene terephthalate) copolyester (PETG).

BACKGROUND

Polymer sheets that can be used as interlayers in light-transmitting, multiple layer laminates, such as laminated safety glass or polymeric laminates, typically comprise poly(vinyl butyral). Laminated safety glass generally refers to a transparent laminate comprising a poly(vinyl butyral) sheet disposed between two panes of glass. Laminated safety glass often is used to provide a transparent or decorative barrier in architectural and automotive openings. Its main function is to absorb energy, such as that caused by a blow from an object, without allowing penetration through the opening. The function of poly(vinyl butyral) in the laminated safety glass is to prevent glass from forming sharp fragments after the glass is broken, to offer the penetration resistance to the glass, and to provide other functions, such as aesthetic functions and decoration.

Although poly(vinyl butyral) is well suited in general for use as a polymer sheet in safety glass interlayers, alternative materials are often useful as well. For example, poly(ethylene-co-vinyl acetate) (EVA) and polyurethane have both been used as interlayers in glazing laminates.

Interlayer materials are chosen for, among other reasons, improved handling, reduced cost of production, and improved performance. For applications in which the interlayer is not optically transparent and contributes to the aesthetic appeal of the glazing, interlayer materials are chosen for their appearance. Such applications include, for example, architectural applications in which a protective, decorative barrier between two spaces is desired.

Accordingly, further improved materials for use as an interlayer or part of an interlayer in multiple layer glass panels are needed in the art.

SUMMARY OF THE INVENTION

It has now been discovered, according to the present invention, that interlayers comprising a blend of plasticized poly(vinyl butyral) and poly(cyclohexanedimethylene terephthalate-co-ethylene terephthalate) copolyester can be used to form interlayers having a pearly white appearance. Such interlayers are useful in applications in which a colored multiple layer glass interlayer is desirable.

DETAILED DESCRIPTION

Figure 1:
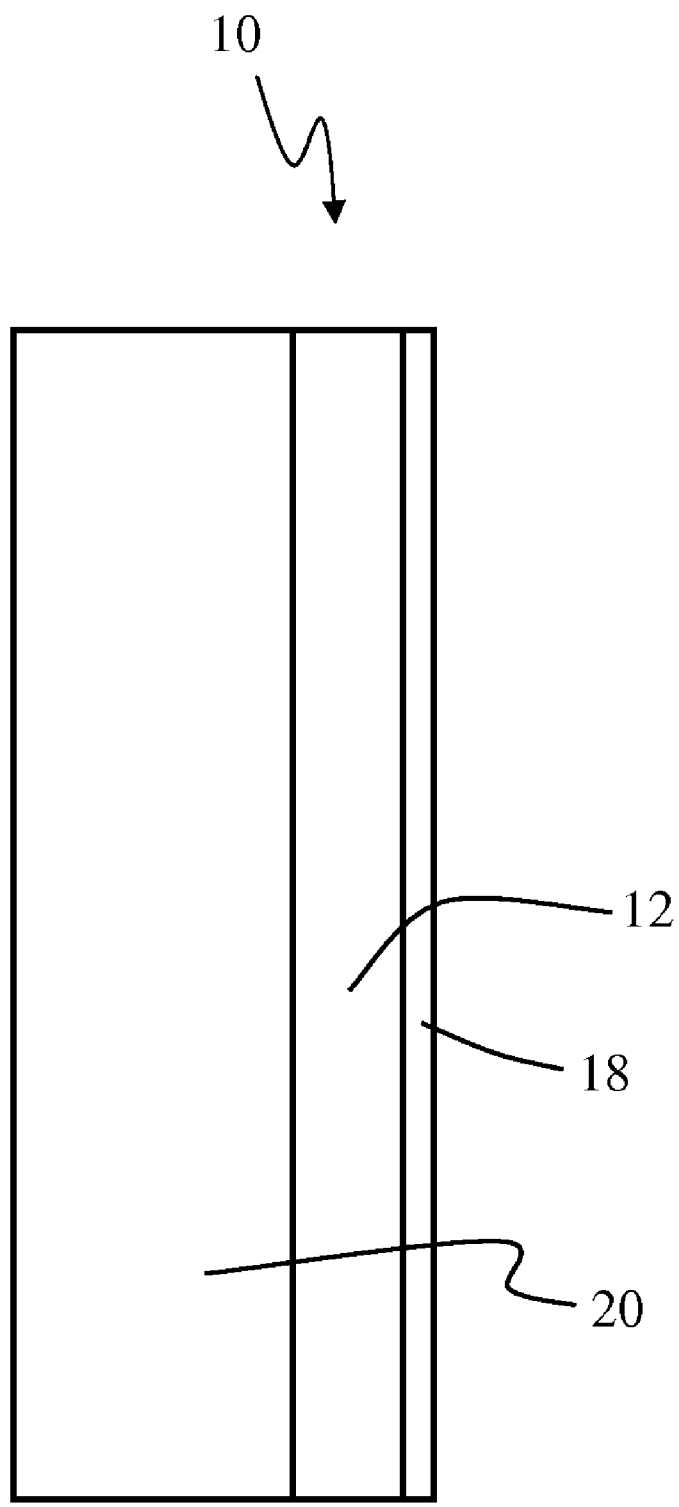
FIG. 1 represents a schematic cross sectional view of one embodiment of a bilayer of the present invention.

The present invention is directed to interlayers that can be used in multiple layer laminated glass constructs such as those used in architectural applications. Interlayers of the present invention incorporate one or more polymer sheets comprising a blend of plasticized poly(vinyl butyral) and poly(cyclohexanedimethylene terephthalate-co-ethylene terephthalate) copolyester ("blended polymer sheets"). Those sheets, when disposed between two panes of rigid glazing substrate, such as glass, or between a rigid glazing substrate and a polymer film, as used in bilayers, provide an impact resistant layer having an aesthetically pleasing pearlescence.

As used herein, poly(cyclohexanedimethylene terephthalate-co-ethylene terephthalate), or "PETG", refers to poly(1,4-cyclohexanedimethylene terephthalate-co-ethylene terephthalate) copolyester.

As is known in the art, the reaction of ethylene glycol with terephthalic acid results in poly(ethylene terephthalate). Addition of cyclohexanedimethanol, shown below, to the reaction results in poly(cyclohexanedimethylene terephthalate-co-ethylene terephthalate) copolyester. The poly(cyclohexanedimethylene terephthalate-co-ethylene terephthalate) resins are available commercially in various forms from, for example, Eastman Chemical Company (Kingsport, Tenn.) as Spectar™ or Eastar™ resin and SK Chemicals (South Korea) as SKYGREEN® resin.

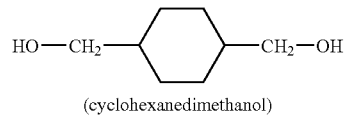

(cyclohexanedimethanol)

Poly(cyclohexanedimethylene terephthalate-co-ethylene terephthalate) copolyester compositions of the present invention that are incorporated into a blend of poly(vinyl butyral) and poly(cyclohexanedimethylene terephthalate-co-ethylene terephthalate) copolyester comprise, on a weight per weight basis of the poly(cyclohexanedimethylene terephthalate-co-ethylene terephthalate) copolyester, at least 10% of the following poly(ethylene terephthalate) component:

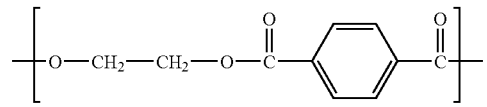

With the remainder being all, or substantially all of the following poly(1,4 cyclohexanedimethylene terephthalate) component:

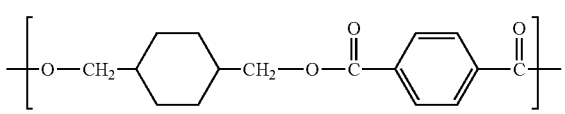

In various embodiments of the present invention, poly(cyclohexanedimethylene terephthalate-co-ethylene terephthalate) copolyester comprises at least 10%, 20%, 30%, 40%, 50%, 60%, 70%, 80%, or 90% of the poly(ethylene terephthalate) component, with an upper maximum of no more than 90%, 95%, and, in some embodiments, no more than 99% of the poly(ethylene terephthalate) component.

In various alternative embodiments of the present invention, a polymer sheet comprising poly(cyclohexanedimethylene terephthalate-co-ethylene terephthalate) copolyester can comprise as an optional component isomers of terephthalic acid, such as isophthalic acid, which can be added to the reaction mixture.

Blended polymer sheets of the present invention can comprise any suitable blend of plasticized poly(vinyl butyral) and poly(cyclohexanedimethylene terephthalate-co-ethylene terephthalate) copolyester. In various embodiments, a blended polymer sheet can comprise, on a weight percent basis, 5% to 95% of plasticized poly(vinyl butyral), with the remainder being all or substantially all poly(cyclohexanedimethylene terephthalate-co-ethylene terephthalate) copolyester, for example from 95% to 5%. Preferably, a blended polymer sheet can comprise, on a weight percent basis, 10% to 90% of plasticized poly(vinyl butyral). In a preferred embodiment, a blended polymer sheet can comprise, on a weight percent basis, 60% to 80% of plasticized poly(vinyl butyral), with the remainder being all or substantially all poly(cyclohexanedimethylene terephthalate-co-ethylene terephthalate) copolyester, for example from 40% to 20%.

For a blended polymer sheet comprising <5% of plasticized poly(vinyl butyral), the appropriate adhesion level to glass can not be achieved. Neither does the pearlescent appearance. For the blended polymer sheet comprising >95% of plasticized poly(vinyl butyral), the pearlescent appearance can't be achieved. Other additives and agents, as disclosed elsewhere herein, can also be included to improve the physical and/or optical properties of the blended polymer sheet.

In some embodiments, adhesion promoters can be included in or sprayed on a blended polymer sheet to promote adhesion to glass. Adhesion promoters that are useful with blended polymer sheets of the present invention include silane coupling agents, such as, γ-glycidoxypropyltrimethoxysilane, γ-aminopropyltriethoxysilane, β-cyclohexylethyltrimethoxysilane, N-β-aminoethylaminomethylphenylethyltrimethoxysilane, N-β-aminoethyl-γ-aminopropyltrimethoxysilane, bis(β-hydroxyethyl)-γ-aminopropyltriethoxysilane, and the like; acrylic adhesives; cyanoacrylates cement; polyurethanes adhesives; polyester adhesives; and the like.

As used herein, a "laminated glass interlayer" or "multiple layer glazing interlayer" means one or more polymer layers that function together to provide resistance to penetration through, and glass fragmentation from, a multiple layer glazing. In its simplest form, an interlayer is a single blended polymer sheet. In other embodiments, multiple polymer sheets, one or more of which is a blended polymer sheet of the present invention, can be laminated together to form an interlayer. In yet further embodiments, a performance enhancing polymer film layer can be included, where appropriate, for example between two blended polymer sheets.

In further embodiments, as shown in FIG. 1 generally at 10, which are known as bilayers, a blended polymer sheet 12 is disposed between a polymer film 18 and a rigid substrate 20, which can be glass or another rigid glazing substrate, such as rigid plastic having a high glass transition temperature. In these bilayer embodiments, the blended polymer sheet can have any of the compositions and characteristics given above, and any of the adhesion promoters given elsewhere herein can also be used. As used herein, a "laminated glass interlayer" or "multiple layer glazing interlayer", includes the one or more layers that form the polymeric component of bilayers—for example, layers 12 and 18 in FIG. 1. Overall thickness of bilayer embodiments can be, for example, from 0.26 millimeters and thicker.

The embodiments described above and shown in FIG. 1 include interlayers that are formed by laminating multiple individual polymer layers together into a single, multiple layer interlayer, as well as interlayers formed by other methods of producing interlayers, such as coextrusion and extrusion coating. Either of these extrusion methods can be used to produce a multiple layer interlayer comprising polymer sheets or polymer films.

Polymer Sheet

As used herein, a "polymer sheet" means any thermoplastic polymer composition formed by any suitable method into a thin layer for use in an interlayer that provides adequate penetration and glass retention properties to laminated glazing panels. A "blended polymer sheet", as described above, is a polymer sheet that comprises both poly(vinyl butyral) and poly(cyclohexanedimethylene terephthalate-co-ethylene terephthalate) copolyester.

In various embodiments of the present invention, polymer sheets and blended polymer sheets can be between 0.01 and 4.0 millimeters, 0.1 to 2.0 millimeters, 0.25 to 1.0 millimeters, or 0.3 to 0.7 millimeters in thickness. In other applications, thickness can be about 1 to 2 centimeters or thicker. In certain security applications, thickness can significantly increase, and multiple layers of thin polymer sheets, for example 30, 40, or 50 polymer sheets, can be laminated together to form a single very thick layer.

Polymer sheets of the present invention can comprise any suitable polymer, and, in a one embodiment, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives, including plasticizers, disclosed herein can be used with the polymer sheet having a polymer consisting of or consisting essentially of poly(vinyl butyral).

In one embodiment, a polymer sheet comprises a polymer based on partially acetalized poly(vinyl alcohol)s. In further embodiments the polymer sheet comprises poly(vinyl butyral) and one or more other polymers. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising poly(vinyl butyral), the poly(vinyl butyral) can be produced by any suitable method. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, 3$^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

In various embodiments, the resin used to form polymer sheets or blended polymer sheets comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The resin can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

In various embodiments, polymer sheets and blended polymer sheets comprise poly(vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350,000 g/m (see, for example, U.S. Pat. Nos. 4,902,464; 4,874,814; 4,814,529; 4,654,179). As used herein, the term "molecular weight" means the weight average molecular weight.

Various adhesion control agents can be used in polymer sheets and blended polymer sheets of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate) (chemical abstracts number 79992-76-0). In various embodiments of the present invention the magnesium salt is magnesium bis(2-ethyl butyrate).

Additives may be incorporated into polymer sheets and blended polymer sheets to enhance their performance in a final product. Such additives include, but are not limited to, the following agents: antiblocking agents, plasticizers, dyes, pigments, stabilizers (e.g., ultraviolet stabilizers), antioxidants, flame retardants, IR absorbers, and combinations of the foregoing additives, and the like, as are known in the art.

In various embodiments of polymer sheets and blended polymer sheets of the present invention, the poly(vinyl butyral) component can comprise 5 to 60, 25 to 60, 5 to 80, or 10 to 70 parts plasticizer per one hundred parts of poly(vinyl butyral) resin (phr). Of course other quantities can be used as is appropriate for the particular application.

The amount of plasticizer can be adjusted to affect the glass transition temperature ($T_g$) of the poly(vinyl butyral) sheet. In general, higher amounts of plasticizer are added to decrease the $T_g$. Poly(vinyl butyral) polymer sheets of the present invention can have a $T_g$ of, for example, 55° C. or less, 45° C. or less, 30° C. or less, 25° C. or less, 20° C. or less, and 15° C. or less.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779 and $C_6$ to $C_8$ adipate esters, such as hexyl adipate. In various embodiments, the plasticizer used is dihexyl adipate and/or triethylene glycol di-2 ethylhexanoate.

In various other embodiments of the present invention, polymer sheets comprise a polymer selected from the group consisting of polyurethane, polyvinyl chloride, poly(ethylene-co-vinyl acetate), polyethylene, polyethylene copolymers, partially neutralized ethylene/(meth)acrylic copolymers, combinations thereof, and the like.

Various embodiments include poly(ethylene-co-vinyl acetate) as describe in U.S. Pat. No. 4,614,781, U.S. Pat. No. 5,415,909, U.S. Pat. No. 5,352,530, and U.S. Pat. No. 4,935,470. Various embodiments include polyurethane comprising, for example, aliphatic isocyanate polyether based polyurethane (available from Thermedics Polymer Products of Noveon Inc.). Other additives can be incorporated into the polyurethane resins during extrusion, such as UV stabilizers and functional chemicals to provide high adhesion to glass.

Polymeric resins can be thermally processed and configured into sheet form according to methods known to those of ordinary skill in the art. As used herein, "resin" refers to the polymeric (for example poly(vinyl butyral) or poly(vinyl chloride)) component of a polymer composition. Resin will generally have other components in addition to the polymer, for example, components remaining from the polymerization process. As used herein, "melt" refers to a melted mixture of resin with a plasticizer, if required, and optionally other additives, for example, performance enhancing agents.

One exemplary method of forming a poly(vinyl butyral) sheet comprises extruding molten poly(vinyl butyral) comprising resin, plasticizer, and additives—the melt—by forcing the melt through a sheet die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet.

Blended polymer sheets of the present invention can be formed using any conventional method, such as those just described. The melt can be prepared, for example, by combining the appropriate proportions of poly(vinyl butyral) and poly(cyclohexanedimethylene terephthalate-co-ethylene terephthalate) copolyester resins, as well as any other additives and agents, and melt blending the components. Sheets can be thereafter formed using, for example, the sheet die or casting methods described elsewhere herein.

In coextrusion embodiments and extrusion coating embodiments, the outside surfaces of the multiple layer interlayers can be treated to create surface texture, or roughness, to facilitate deairing during the lamination procedure. Such surface texturing, which can be accomplished, for example, with melt fracture or embossing, is well known in the art.

Polymer Film

As used herein, a "polymer film" means a relatively thin and rigid polymer layer that functions as a performance enhancing layer. Polymer films differ from polymer sheets, as used herein, because polymer films do not themselves provide the necessary impact resistance and glass retention properties to a multiple layer glazing structure, but rather provide performance improvements, such as infrared absorption character. Poly(ethylene terephthalate) is most commonly used as a polymer film.

Polymer films used in the present invention can be any suitable film that is sufficiently rigid to provide a relatively flat, stable surface, for example those polymer films conventionally used as a performance enhancing layer in multiple layer glass panels. The polymer film is preferably optically transparent (i.e. objects adjacent one side of the layer can be comfortably seen by the eye of a particular observer looking through the layer from the other side), and usually has a greater, in some embodiments significantly greater, tensile modulus regardless of composition than that of the adjacent polymer sheet. In various embodiments, the polymer film comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film comprises materials such as re-stretched thermoplastic films having the noted properties, which include polyesters. In various embodiments, the polymer film comprises or consists of poly(ethylene terephthalate), and, in various embodiments, the poly(ethylene terephthalate) has been biaxially stretched to improve strength, and/or has been heat stabilized to provide low shrinkage characteristics when subjected to elevated temperatures (e.g. less than 2% shrinkage in both directions after 30 minutes at 150° C.).

In various embodiments, the polymer film can have a thickness of 0.013 millimeters to 0.25 millimeters, 0.025 millimeters to 0.1 millimeters, or 0.04 to 0.06 millimeters. The polymer film can optionally be surface treated or coated with a functional performance layer to improve one or more properties, such as adhesion or infrared radiation reflection. These functional performance layers include, for example, a multilayer stack for reflecting infra-red solar radiation and transmitting visible light when exposed to sunlight. This multilayer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known (see, for example, U.S. Pat. Nos. 4,017,661 and 4,786,783), the metal layer(s) may optionally be electrically resistance heated for defrosting or defogging of any associated glass layers. Various coating and surface treatment techniques for poly(ethylene terephthalate) film and other polymer films that can be used with the present invention are disclosed in published European Application No. 0157030. Polymer films of the present invention can also include a hardcoat and/or and antifog layer, as are known in the art.

In various embodiments of the present invention, blended poly(vinyl butyral) and poly(cyclohexanedimethylene terephthalate-co-ethylene terephthalate) copolyester polymer sheet and/or polymer film layers such as poly(ethylene terephthalate) can be directly printed with dyes, inks, pigments, and the like to impart a pattern or other optical effect upon the finished product.

The present invention includes multiple layer glass panels comprising any interlayers of the present invention.

The present invention includes methods of making interlayers and multiple layer glass panels comprising forming any of the interlayers and glass panels of the present invention by the methods described herein.

The present invention includes multiple layer glazing panels, and specifically multiple layer glass panels such as architectural safety glass and automobile windshields, including two glazing panels and bilayers, comprising any of the interlayers of the present invention.

The present invention includes methods of manufacturing a multiple layer glass panel, comprising disposing any of the interlayers of the present invention, with or without additional polymeric layers, between two panes of glass and laminating the stack.

The present invention includes methods of securing an enclosed space, comprising disposing in one or more openings that provide access to said space a multiple layer glass panel of the present invention.

Also included in the present invention are stacks or rolls of any of the polymer interlayers of the present invention disclosed herein.

In addition to the embodiments given above, other embodiments comprise a rigid glazing substrate other than glass. In these embodiments, the rigid substrate can comprise acrylic such as Plexiglass® polycarbonate such as Lexan®, and other plastics, that are conventionally used as glazings.

Example 1

Polymer sheets made of the blends of plasticized poly(vinyl butyral) and PETG are formed according to the following:

Plasticized poly(vinyl butyral) pellets comprising 100 parts of poly(vinyl butyral) resin, 38 parts triethylene glycol di-2 ethylhexanoate plasticizer, and other small amount of additives are melt blended with PETG having compositions in weight percentage as listed in Table 1, and are extruded with a single screw extruder at a temperature of 190° C. into 0.76 millimeter thick sheet. The appearance of the finished sheets of each blend is summarized in Table 1.

TABLE 1

| | Blend Composition | | |
|---|---|---|---|
| Sample Number | PETG/ wt % | Plasticized PVB pellets/ wt % | Appearance |
| 1 | 0 | 100 | Transparent |
| 2 | 10 | 90 | Light pearly white |
| 3 | 30 | 70 | Very attractive pearly white |
| 4 | 50 | 50 | Attractive pearly white |
| 5 | 80 | 20 | Attractive pearly white |
| 6 | 100 | 0 | Transparent |

Figure 2:
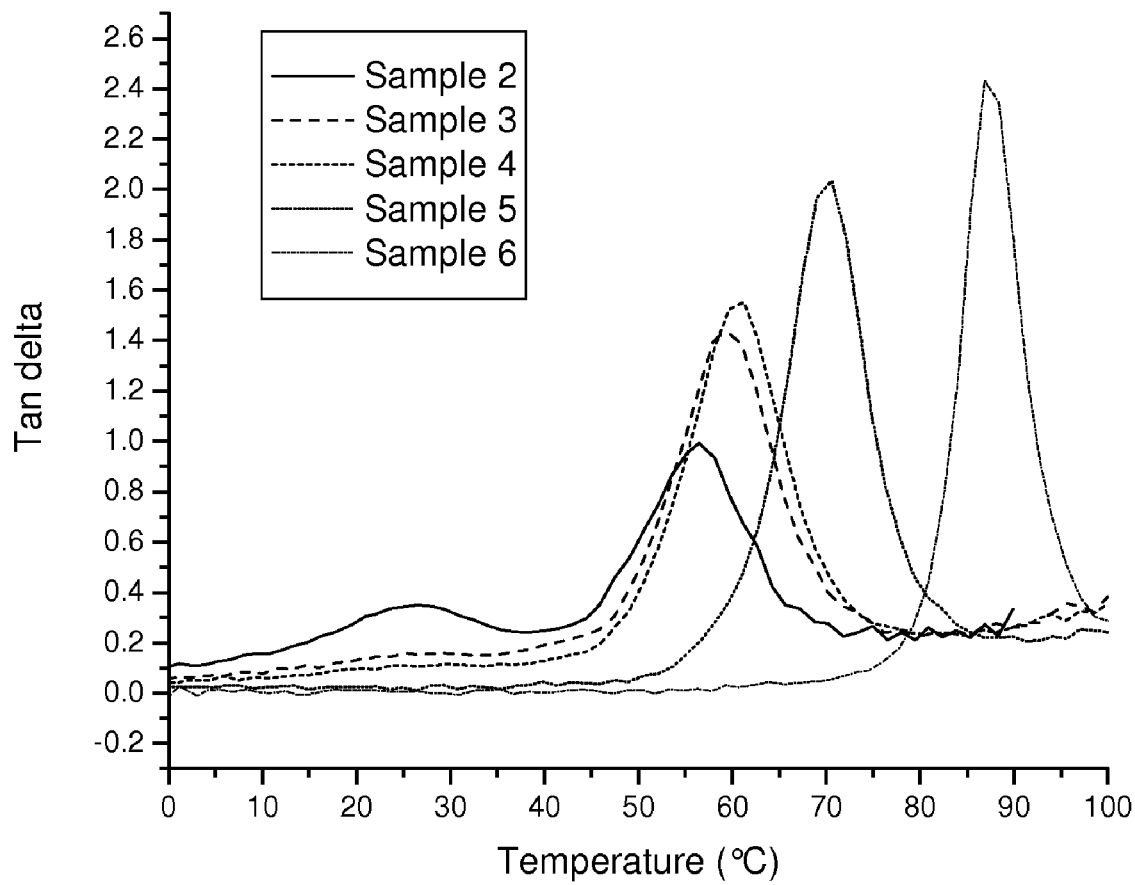
FIG. 2 is a graph of tan delta vs. temperature for various blended samples.

FIG. 2 shows the glass transition temperatures ($T_g$) of the blends of plasticized poly(vinyl butyral) and PETG for the samples listed in Table 1. There are two $T_g$'s for samples 2, 3, and 4, which indicates phase separation between plasticized poly(vinyl butyral) and PETG. The higher temperature peak is from the PETG phase, and the lower temperature peak is from the plasticized poly(vinyl butyral) phase. The decrease of the $T_g$ peak of the PETG phase with the increase of plasticized poly(vinyl butyral) weight percentage indicates that part of plasticized poly(vinyl butyral) is miscible in the PETG phase, and, on the other hand, the $T_g$ of the plasticized poly(vinyl butyral) phase virtually does not change with composition, indicating that little PETG is miscible in the plasticized poly(vinyl butyral) phase.

For sample 5, 20% plasticized poly(vinyl butyral) is blended with PETG and the blend still has a pearly white appearance, but only one $T_g$ is identified, and the $T_g$ is approximately at the mean value of the $T_g$ of the virgin PETG and plasticized poly(vinyl butyral) according to their weight percentage, indicating that plasticized poly(vinyl butyral) and PETG at this composition formed a very fine two-phase phase-separated structure with the phase separation size under the scale of Tg measurement resolution.

Table 2 shows the color measurements of Sample 3 in a 0.030" (0.762 millimeters) thick sheet form and after lamination with clear glass or Starfire glass manufactured made by PPG Industries.

TABLE 2

| Description | % Tv | L | a | b |
|---|---|---|---|---|
| 70/30 by wt plasticized PVB/PETG sheet with clear glass (2.3 mm PPG clear glass) laminate | 18.95 | 50.63 | −0.95 | 8.37 |
| 70/30 by wt plasticized PVB/PETG sheet with Starfire Glass | 23.05 | 55.13 | 0.72 | 8.77 |

By virtue of the present invention, it is now possible to provide interlayers comprising blended poly(vinyl butyral)/poly(cyclohexanedimethylene terephthalate-co-ethylene terephthalate) copolyester, which allows the formation of multiple layer glazings having a pearly white appearance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer sheet can be formed comprising blended polymers in any of the ranges given in addition to any of the ranges given for an adhesion promoter, to form many permutations that are within the scope of the present invention.

Figures are understood to not be drawn to scale unless indicated otherwise.

Each reference, including journal articles, patents, applications, and books, referred to herein is hereby incorporated by reference in its entirety.

We claim:

1. A laminated glass interlayer, comprising:
   a polymer sheet comprising a blend of plasticized poly(vinyl butyral) and poly(cyclohexanedimethylene terephthalate-co-ethylene terephthalate) copolyester, wherein said polymer sheet comprises 5 to 95 weight percent of said poly(cyclohexanedimethylene terephthalate-co-ethylene terephthalate) copolyster and 95 to 5 weight percent of said plasticized poly(vinyl butyral);
   and wherein said plasticized poly(vinyl butyral) has 5 to 60 parts of plasticizer per one hundred parts of poly(vinyl butyral) resin (phr);
   wherein said polymer sheet has a pearlescent appearance; and
   wherein said pearlescent appearance is caused solely by said blend of plasticized poly(vinyl butyral) and poly(cyclohexanedimethylene terephthalate-co-ethylene terephthalate) copolyester.

2. The interlayer of claim 1, wherein said polymer sheet comprises 10 to 90 weight percent of said poly(cyclohexanedimethylene terephthalate-co-ethylene terephthalate) copolyester and 90 to 10 weight percent of said plasticized poly(vinyl butyral).

3. The interlayer of claim 1, wherein said polymer sheet comprises 20 to 40 weight percent of said poly(cyclohexanedimethylene terephthate-co-ethylene terephthalate) copolyester 80 to 60 weight percent of said plasticized poly(vinyl butyral).

4. The interlayer of claim 3, wherein said polymer sheet comprises 30 weight percent of said poly(cyclohexanedimethylene terephthalate-co-ethylene terephthalate) copolyester and 70 weight percent of said plasticized poly(vinyl butyral)), and wherein said polymer sheet has pearly white appearance.

5. The interlayer of claim 1, wherein said polymer sheet comprises poly(cyclohexanedimethylene terephthalate-co-ethylene terephthalate) copolyester comprising at least 10% by weight of poly(ethylene terephthalate) component by weight.

6. The interlayer of claim 1, wherein said polymer sheet comprises poly(cyclohexanedimethylene terephthalate-co-ethylene terephthalate) copolyester comprising at least 20% by weight of poly(ethylene terephthalate) component by weight.

7. The interlayer of claim 1, wherein said polymer sheet has glass transition temperature 55° C. or less.

8. A laminated glass panel comprising:
   a rigid glazing substrate; and,
   a laminated glass interlayer in contact with said substrate, said interlayer comprising;
   a polymer sheet comprising a blend of plasticized poly(vinyl butyral) and poly(cyclohexanedimethylene terephthalate-co-ethylene terephthalate) copolyester; wherein said polymer sheet comprises 5 to 95 weight percent of said poly(cyclohexanedimethylene terephthalate-co-ethylene terephthalate) copolyester and 95 to 5 weight percent of said plasticized poly(vinyl butyral);
   wherein said plasticized poly(vinyl butyral) has 5 to 60 parts of plasticizer per one hundred parts of poly(vinyl butyral) resin (phr); and
   wherein said glass panel has a pearlescent appearance, and wherein said pearlescent appearance is caused solely by said blend of plasticized poly(vinyl butyral) and poly(cyclohexanedimethylene terephthalate-co-ethylene terephthalate) copolyester.

9. The panel of claim 8, wherein said polymer sheet comprises 10 to 90 weight percent of said poly(cyclohexanedimethylene terephthalate-co-ethylene terephthalate) copolyester and 90 to 10 weight percent of said plasticized poly(vinyl butyral).

10. The panel of claim 8, wherein said polymer sheet comprises 20 to 40 weight percent of said poly(cyclohexanedimethylene terephthalate-co-ethylene terephthalate) copolyester and 80 to 60 weight percent of said plasticized poly(vinyl butyral).

11. The panel of claim 8, wherein said polymer sheet comprises poly(cyclohexanedimethylene terephthalate-co-terephthalate) copolyester comprising at least 10% by weight of poly(ethylene terephthalate) component by weight.

12. The panel of claim 8, wherein said polymer sheet comprises poly(cyclohexanedimethylene terephthalate-coethylene terephthalate) copolyester comprising at least 20% by weight of poly(ethylene terephthalate) component by weight.

13. The panel of claim 8, wherein said interlayer further comprises a polymer sheet, comprising a member selected from the group consisting of polyurethane, polyvinyl chloride, poly(ethylene-co-vinyl acetate), polyethylene, polyethylene copolymers, and partially neutralized ethylene/(meth) acrylic copolymers.

14. A method of making a polymer sheet, comprising:
providing plasticized poly(vinyl butyral) pellets;
providing poly(cyclohexanedimethylene terephthalate-co-ethylene terephthalate) copolyester resin;
melt mixing said pellets and said poly(cyclohexanedimethylene terephthalate-co-ethylene terephthalate) copolyester resin to form a blended resin; and
extruding said blended resin to form said polymer sheet;
wherein said polymer sheet comprises 5 to 95 weight percent of said poly(cyclohexanedimethylene terephthalate-co-ethylene terephthalate) copolyester and 95 to 5 weight percent weight of said plasticized poly(vinyl butyral);
wherein said plasticized poly(vinyl butyral) has 5 to 60 parts of plasticizer per one hundred parts of poly(vinyl butyral) resin (phr);
wherein said polymer sheet has a pearlescent appearance; and
wherein said pearlescent appearance is caused solely by said blend of elasticized polyvinyl butyral) and poly (cyclohexanedimethylene) terephthalate-co-ethylene terephthalate copolyester.

15. A method of manufacturing a multiple layer glass panel comprising:
forming a stack by disposing a polymer sheet as an interlayer between two panes of glass,
said polymer sheet comprising a blend of plasticized poly (vinyl butyral) and poly(cyclohexanedimethylene terephthalate-co-ethylene terephthalate) copolyester;
wherein said polymer sheet comprises 5 to 95 weight percent of said poly poly(cyclohexanedimethylene terephthalate-co-ethylene terephthalate) copolyester and 95 to 5 weight percent of said plasticized poly(vinyl butyral);
wherein said plasticized poly(vinyl butyral) has 5 to 60 parts of plasticizer per one hundred parts of poly(vinyl butyral) resin (phr);
laminating the stack to produce the multiple layer glass panel;
wherein said glass panel has a pearlescent appearance; and
wherein said pearlescent appearance is caused solely by said blend of plasticized poly(vinyl butyral) and poly (cyclohexanedimethylene terephthalate-co-ethylene terephthalate) copolyester.

* * * * *